Jan. 2, 1968   D. S. ORR ET AL   3,361,262
ROTARY TABLE FILTER
Filed Dec. 30, 1965   6 Sheets-Sheet 3
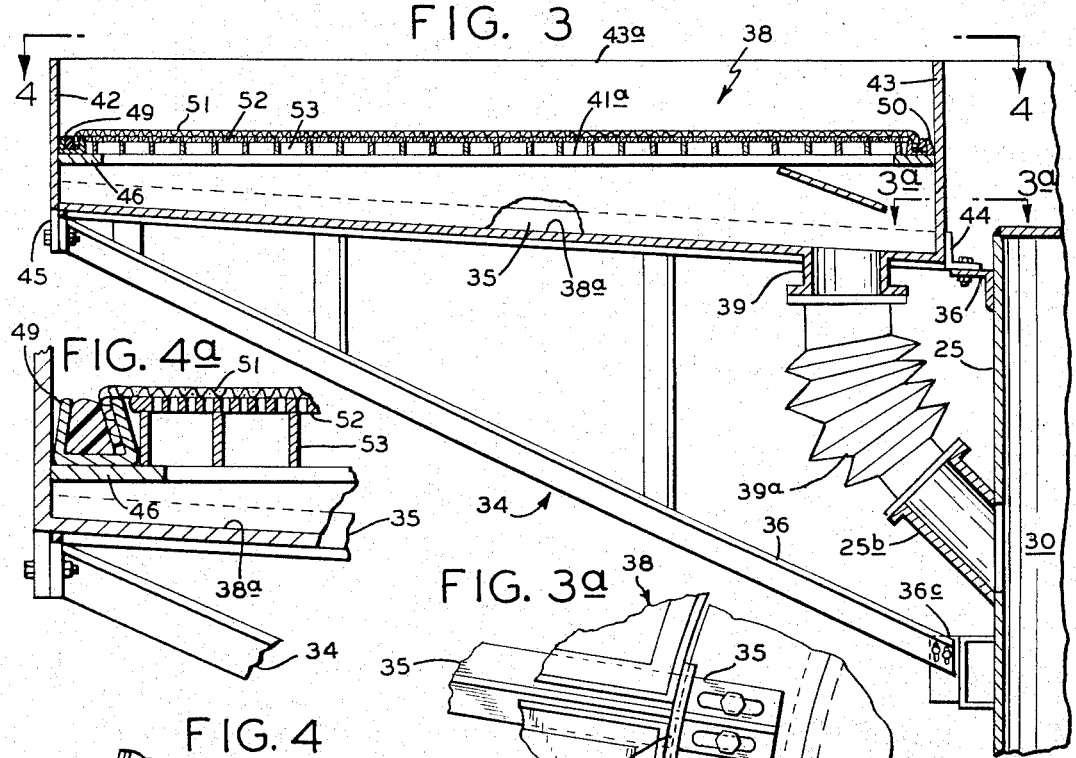
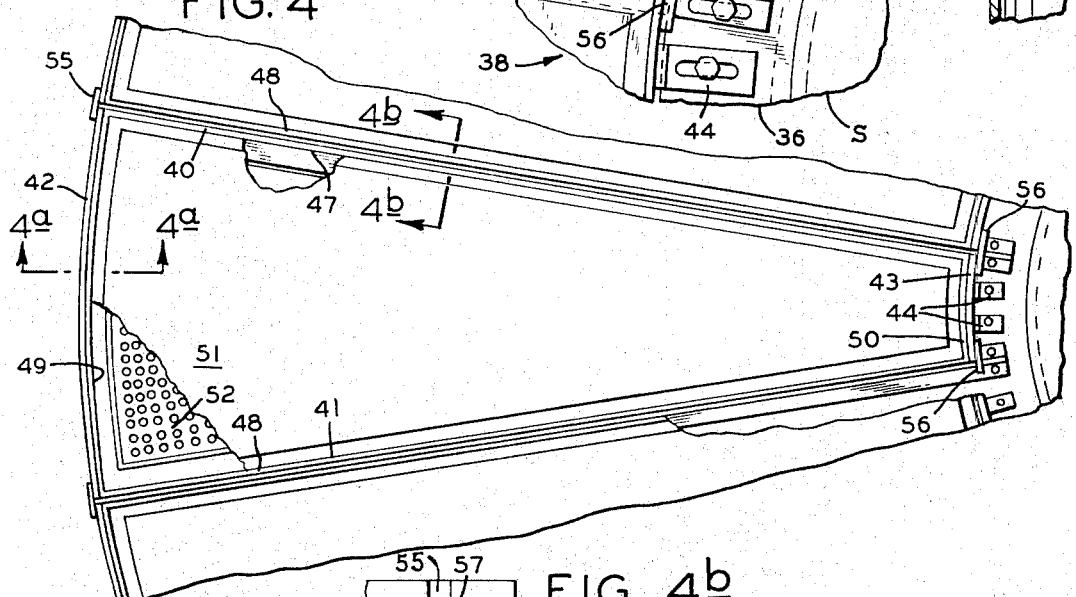
INVENTORS.
DUNDAS S. ORR
WILLIAM R. HRAZANEK
BY Theodore M. Jablon
ATTORNEY.

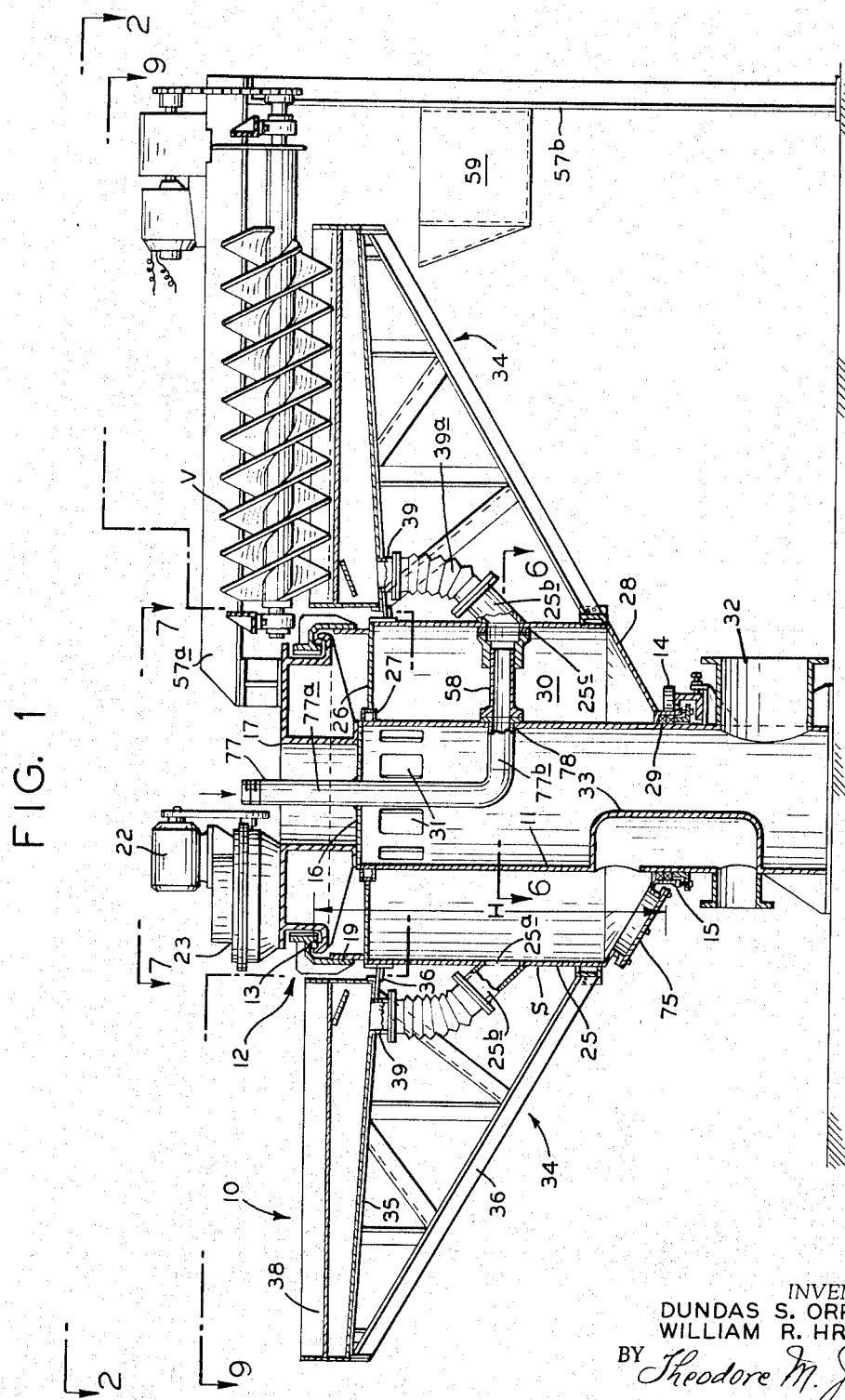

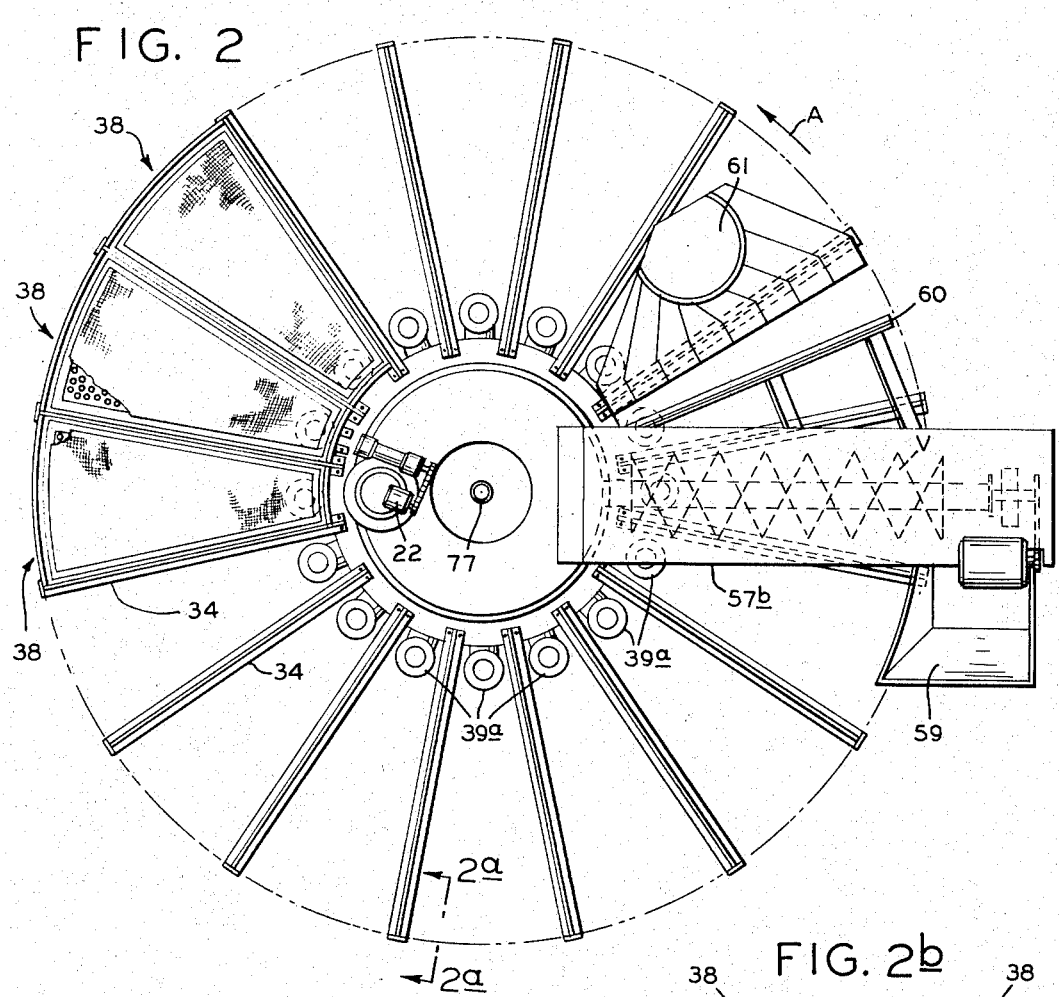
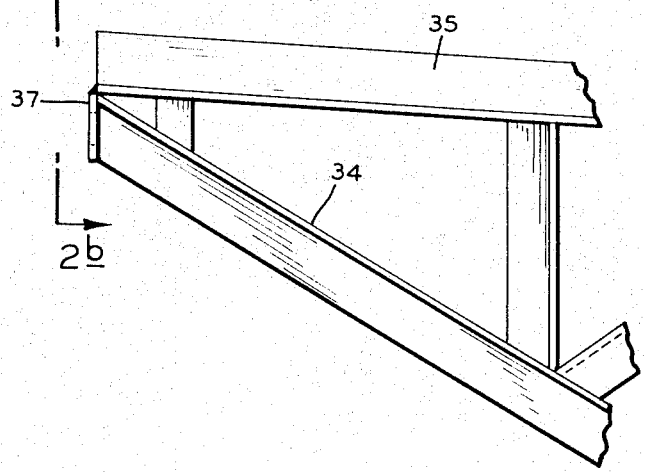
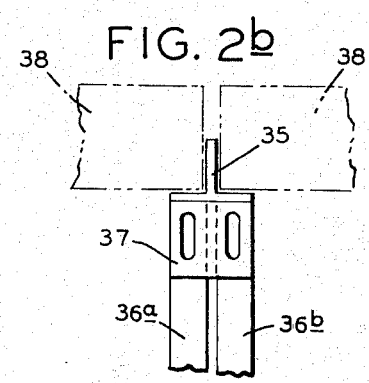
INVENTORS.
DUNDAS S. ORR
WILLIAM R. HRAZANEK
BY Theodore M. Jablon
ATTORNEY.

Jan. 2, 1968 D. S. ORR ET AL 3,361,262
ROTARY TABLE FILTER
Filed Dec. 30, 1965 6 Sheets-Sheet 6

INVENTORS.
DUNDAS S. ORR
WILLIAM R. HRAZANEK
BY Theodore M. Jablon
ATTORNEY.

3,361,262
ROTARY TABLE FILTER
Dundas S. Orr, Stamford, and William R. Hrazanek, Wilton, Conn., assignors to Dorr-Oliver Incorporated, Stamford, Conn., a corporation of Delaware
Filed Dec. 30, 1965, Ser. No. 530,748
15 Claims. (Cl. 210—330)

ABSTRACT OF THE DISCLOSURE

Table filter wherein the rotary filter table is mounted on a hollow central support column, and is formed with a cylindrical shell constituting a vacuum receiver chamber around the column which in turn provides separate ducts for vacuum connection and filtrate delivery also featuring a modular arrangement of individually mounted sector-shaped filter boxes or filtrate chamber units.

This invention relates to improvements in continuously operating horizontal rotary filters also known as rotary table filters. In these filters a large rotary filter table is divided into sector-shaped filtration panels or chambers, with a distributing valve controlling the filtration cycle effective by the rotation of the filter table relative to the stationary valve. The cycle mainly comprises pulp feeding, vacuum suction, and filter cake discharge. Air back blow may be applied in the pulp feeding zone in order that a residual layer of filter cake material may be re-mixed with the incoming pulp.

Conventional filter tables require a large expensive annular support bearing and turntable base for stability, surrounding the distributing valve which is connected to separate vacuum receiver means and, as the case may be, to blow-back means. The annular support bearing underneath the filter table in turn is surrounded by a large sprocket or gear fixed to the underside of the filter table for rotating the same. Thus, in conventional rotary table filters, the high cost of the large annular support bearing, as well as the arrangement of the bearing, of the drive means, and of the valve with its connections, all crowded directly underneath the overhanging table, leaves something to be desired in the way of cost and accessibility for servicing and inspection.

Conventional filter tables comprise a so-called "center island" at which the narrow inner ends of the filter panels terminate. This center island being a part of the rotary table structure may serve for the support of the inner end of a conventional radially extending cake discharge conveyor scroll device. A suitable bearing means must be interposed between the rotating center island and the stationary conveyor device. The invention aims to make other and more effective use of the area of the center island.

Furthermore, large conventional filter tables which may be 20 feet or even 30 feet in diameter present shipping problems, as well as problems of erection including assembly welding operations on the filter table at the erection site, if the table be too large for shipping in one piece.

It is a general object of this invention to provide a table filter of simplified, rugged, and durable yet low cost construction free of the above indicated drawbacks of conventional table filters.

Hence, it is among the more specific objects of this invention (a) To provide a filter construction wherein a much smaller annular support bearing provides adequate working stability for the filter table, independent of the diameter and total capacity of the table filter;

(b) To provide a table filter assembly so constructed and arranged as to avoid problems encountered in the shipping and erection of the filter units because of size, and which assembly therefore should comprise component parts of moderate size and weight, capable of being readily fabricated, as well as readily handled and shipped, as well as readily bolted together, and avoiding welding operations in the field;

(c) And more specifically to provide a filter table construction comprising individual self-contained sector-shaped filter chambers or boxes capable of being readily assembled to constitute the filter table, and in turn being readily dismountable as for restoration of the filter media or else for quick replacement with a complete spare filter chamber unit;

(d) To minimize the cost and space requirements of required vacuum receiver capacity, even while improving its effectiveness in terms of minimizing pressure drop and flow resistance in the vacuum system;

(e) To simplify and reduce the cost of the control valve governing the filtration cycle; and (f) To provide an effective vertical stabilization base for the rotation of the filter table, of extremely simple and low-cost construction, and (g) To provide a rotary table filter the parts of which are readily accessible for servicing and inspection.

The foregoing objects of the invention are attainable in a table filter construction featuring a central support column with a turntable construction mounted thereon at the top for rotatably supporting an annular filter table, and providing a stationary center island.

More particularly, this annular filter table has an inner rim portion or ring gear member supported for rotation upon a stationary turtable base. A stationary drive unit in driving engagement with the ring gear member is preferably supported and mounted upon the turntable base which is serviceable as a stationary center island and for the support of the inner end of a radially extending horizontal conveyer device for filter cake removal, and/or for the support of other structures.

Preferably, a substantial vertical distance downwardly from the annular ball bearing, the rotary table structure cooperates with guide roller means, said vertical distance thus representing a vertical stabilization base for the rotary table structures, made possible by the center column support.

According to one feature, the annular rotary filter table comprises a spider-shaped skeleton structure with spider arms supporting individual sector-shaped filtrate chamber units or panels individually removable therefrom.

According to another feature, the rotary annular filter table structure comprises a depending annular shell concentrically surrounding the center column in sealed relationship therewith at the top and at the botttom. The shell together with the enclosed portion of the column constitutes an annular vacuum receiver chamber having individual external conduit connections with the respective filtrate chamber units, and a vacuum connection through the center column.

Within the vacuum receiver are mounted distributing valve means which may include blow-back means cooperating with the conduit connections and controlling the operation of the filter chamber units.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 1 is a vertical sectional view of a preferred embodiment of the table filter, featuring the center column support with self-contained drive head supporting the filter table with spider arms, a vacuum receiver shell, detachable filtrate chamber units and back-blow valve;

FIG. 2 is a plan view of the table filter taken on line 2—2 of FIG. 1, with most of the filtrate chamber units removed, thus showing more clearly the spider-shaped skeleton construction supporting them;

FIG. 2a is an enlarged detail side view of the outer end portion of one of the spider arms;

FIG. 2b is an end view of the spider arm taken on line 2b—2b in FIG. 2a;

FIG. 3 is an enlarged detail view taken from FIG. 1, more clearly showing the manner of removable mounting of the filtrate chamber units upon the spider arms;

FIG. 3a is a detail sectional view taken on line 3a—3a in FIG. 3, showing the mounting of the filter medium in a filtrate chamber unit;

FIG. 4 is a plan view taken on line 4—4 of FIG. 3;

FIG. 4a is an enlarged detail view of the outer end of the filter box unit shown in FIG. 3;

FIG. 4b is a detail sectional view taken on line 4b—4b in FIG. 4, showing the mounting of the filter medium in a filtrate chamber unit;

Figure 5:
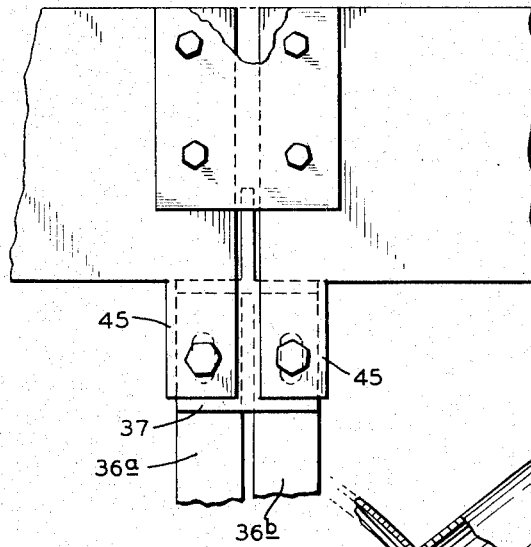
FIG. 5 is an enlarged detail view taken from FIG. 2, showing the outer end mounting of mutually adjoining filtrate chamber units.

In the preferred embodiment herein illustrated the rotary table filter according to the invention comprises a filter table structure 10 which surrounds a substantial portion of the height of a fixed hollow tubular support center column 11, and is supported at the top end of the column by a turntable construction 12 preferably comprising an annular combination ball bearing 13 constructed to absorb vertical thrust from the load of the turntable as well as any radial forces. A vertical distance H downwardly from the ball bearing, the lower end of the rotary table structure is preferably guided as by a set of guide rollers 14 shown to be mounted upon the center column, and adjustable to engage an annular guide track 15 provided upon the lower end of the rotary table structure, with the distance H thus representing a vertical stabilization base for the rotary filter table structure. The top end of the tubular center column is closed by a top plate 16 preferably welded thereto.

More particularly, the turntable construction comprises (see FIG. 8) a stationary base member 17 mounted atop the column, and a rotary member in the form of an internally toothed ring gear member 18 supported for rotation by ball bearing 13. The ring gear in turn supports the filter table through a rigid connection 19. The base member more in detail comprises an inner cylindrical foot portion 17a, an intermediate annular horizontal platform portion 17b extending outwardly from the top end of the cylindrical portion, and an outer annular trough 17c depending from the outer edge portion of the platform portion. The trough portion in turn comprises an inner annular wall 17d depending from the platform portion, an annular bottom 17e, and a relatively low outer wall 17f. The ring gear member supported by the ball bearing adjacent to the outer wall 17f, comprises an internally toothed annular portion 17g lodging substantially in the trough, and a flange portion 17h extending outwardly from the toothed portion across the outer wall 17f and then downwardly to provide connection 19. An oil bath for the gear is contained in the trough.

Figure 7:
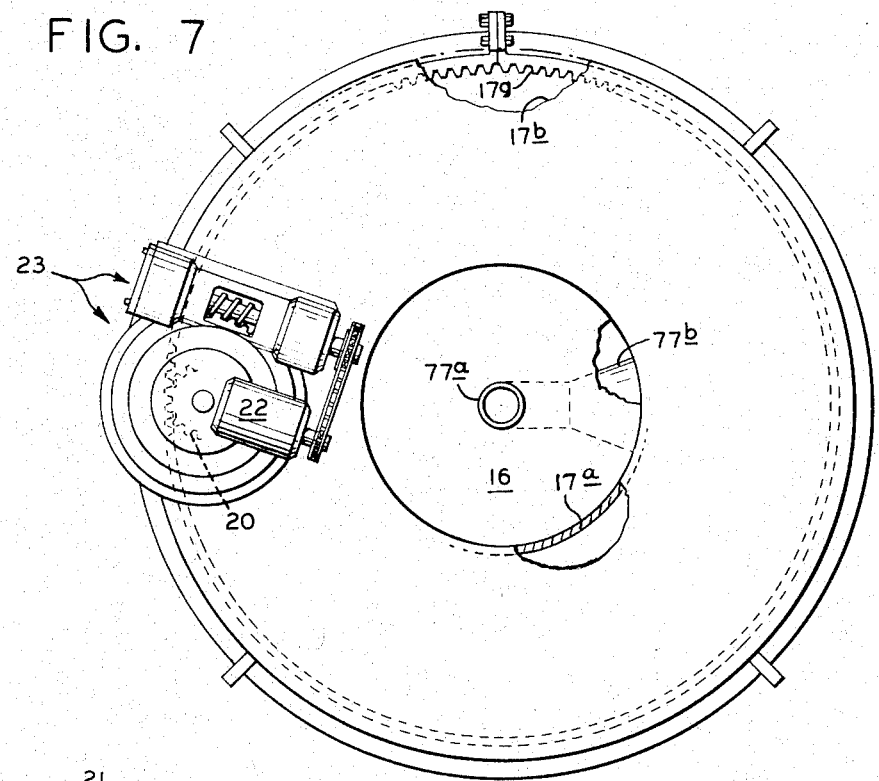
FIG. 7 is an enlarged detail top view of the drive head supporting the filter table, taken on line 7—7 in FIG. 1.
Figure 8:
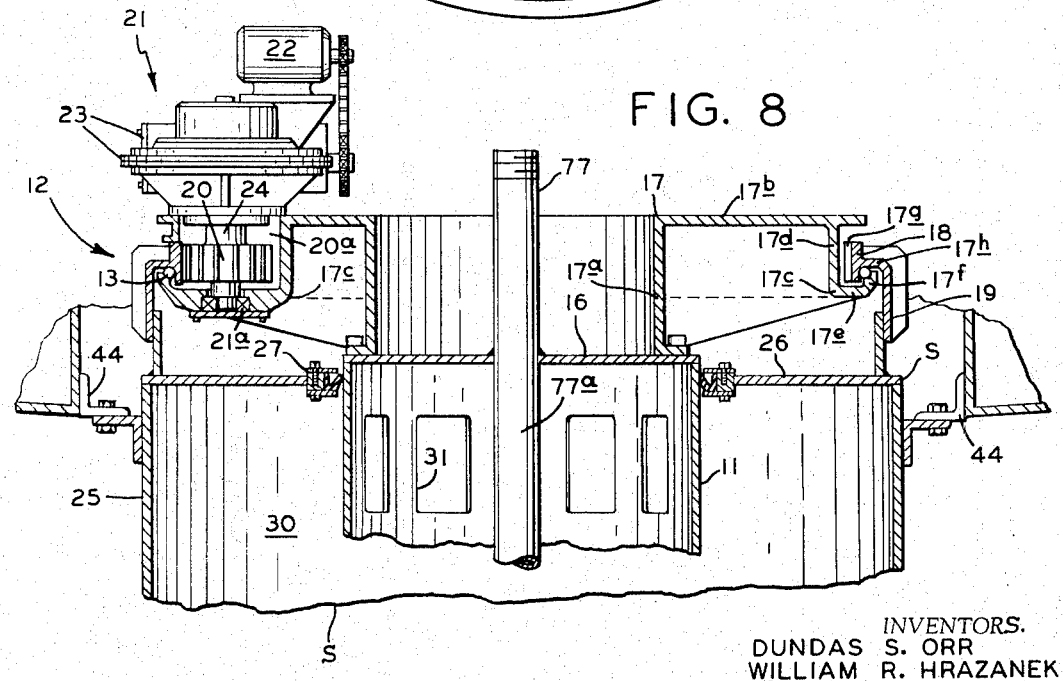
FIG. 8 is a vertical sectional view taken from FIG. 7.

The ring gear is driven by a pinion 20 accommodated in a pocket 20a formed in the trough portion 17c. This pinion is part of a motorized pinion drive unit 21 mounted on the platform portion, the lower end of the pinion shaft having a guide bearing 21a provided in the bottom of the trough portion 17c. FIGURES 7 and 8 show the drive unit with drive motor 22 mounted on a worm gear drive 23, and the worm gear shaft 24 carrying the pinion 20. It may be said therefore that the turntable construction including the fixed base member 17, the rotary gear member 18, and the drive unit 21 together constitute a self-contained drive head or pre-assembled unit which as such may be placed upon and fixed to the top of the center support column. This drive head 21 presents a stationary platform or stationary center island which readily lends itself for the support of the filter cake removal devices or other structures, as will be furthermore described.

The filter table structure comprises a large hollow hub portion or annular shell S fixed to the ring gear member by connection 19, and closing around the center column at the top and at the bottom. Accordingly, this shell has a vertical cylindrical portion 25, an annular horizontal top plate 26 welded to the top end of the cylindrical portion, with annular sealing means 27 effective between it and the column during rotation of the filter table. A conical bottom portion 28 with the narrow end pointing downwardly has the wide end welded to the lower end of the cylindrical portion, with annular sealing means such as a stuffing box 29 effective between it and the column during rotation of the filter table.

The stationary column and the surrounding shell S of the rotary structure together constitute an annular vacuum receiver chamber 30 communicating at the top through air passage ports 31 with the interior of the column and then through outlet neck 32 in the foot end of the column with a vacuum source here not shown. Filtrate liquid collecting in the bottom portion of the vacuum chamber discharges separately through a bridging conduit 33 provided interiorly of the column and leading from a level above the stuffing box 29 to a level below the same. Openings 25a are provided in the cylindrical portion 25 of annular shell S equally spaced from one another along the periphery, each opening having extending therefrom a flanged neck 25b directed at an upward inclination. The horizontal zone of the shell, wherein the openings are located, has internally fitted therein and welded thereto a reinforcing cylindrical member 25c having openings substantially registering with openings 25a. The member 25c provides a carefully machined built up inner cylindrical face F adapted for cooperation or sliding contact with a stationary valve device 53 to be described below, for controlling the filtration cycle.

The structure of the rotary filter table further comprises a set of spider arms 34 here shown in the form of girders extending from, and detachably bolted to the cylindrical portion of the shell. The upper truss 35 in this girder is of inverted T-shaped cross-section, and has its inner end bolted to an annular ledge 36 (see FIGURE 3) welded to the upper end of the shell as shown particularly in FIGS. 3 and 4a. The truss 35 slightly inclined from the outer end towards the inner end, substantially conforms to the bottom formation of filtrate chamber units further to be described. The lower truss 36 more steeply inclined is composed of two symmetrically arranged angle irons 36a and 36b the inner or lower ends of which are bolted to a connector plate 36c extending radially from the lower end of the cylindrical portion of the shell. The converging outer ends of the upper and lower trusses are interconnected at their juncture by a vertical end plate 37 welded thereto. (See FIGS. 2a and 2b.) Suitable vertical and diagonal brace members interconnect the upper and the lower truss.

The arms 34 support, and have detachably mounted thereon a corresponding number of sector-shaped filtrate chamber units 38, so that the combined sector-shaped filter areas of these units constitute the total available annular filter area of the filter table.

Each of the sector-shaped filter chamber units is supported by a pair of the spider arms, so that each arm supports the mutually adjoining sides of a pair of mutually adjoining units. Referring particularly to FIGS. 1, 3 and 4, a unit 38 comprises a sector-shaped box which has a sector-shaped bottom 38a inclined towards the narrow end thereof and provided with an outlet neck 39. Each neck 39 has a bellows-type flexible tube connection 39a with a respective neck 25b, providing communication between each filtrate chamber unit 38 and the vacuum chamber 30. The box has two side walls 40 and 41 having horizontal top edges. At the wide end, the side walls are inter-connected by an end wall 42, and at the narrow end by an end wall 43, both end walls terminating upwardly in a common horizontal plane 43a substantially above the horizontal top edges of the side walls 40 and 41.

The narrow end of the box has fixed thereto a pair of horizontal fastening lugs or brackets 44 bolted to the annular shelf 36. The outer end wall 42 of the box has downwardly extending lugs or tongues 45 bolted to the vertical end plates 37 of the respective spider arms.

The boxes are set up upon the supporting spider arms so that the lateral bottom corners of each pair of mutually adjoining boxes (see FIG. 2b and FIG. 5) have between them the upstanding web 35a of upper truss 35.

An internal horizontal shelf 46 extends along the side walls and end walls of the above described sector-shaped box. Upon this shelf or frame are fixed correspondingly extending channel members 47 and 48 along respective sides, and channel members 49 and 50 along respective ends of the box. These channel members constitute in effect an endless groove for fastening and caulking therein the edge portion of a filter medium 51 supported, for example, by a perforated backing plate 52 which in turn is supported by a coarse grid 53 resting upon the shelf.

When all the filtrate chamber units 38 are set up and aligned with one another upon the annular shelf 36 and the spider arms, the inner end walls of all the boxes will constitute the inner cylindrical boundary wall of the filter table, the outer end walls constituting the outer cylindrical boundary wall, both concentric boundary walls defining between them the total annular filter area of the rotary filter table. However, in this connection it will be noted that the narrow vertical gaps between respective end plates due to the presence of truss web 35a, are closed as by removable vertical patch plates 55 interconnecting the mutually adjoining outer end walls 42, and by patch plates 56 interconnecting mutually adjoining inner end walls 43, as well as by caulking at 57 along mutually adjoining side walls of the boxes, and caulking of the patch plates wherever necessary.

Mounted upon the center column and located within the annular receiver chamber is a stationary valve device 58 (see FIGS. 1, 6, and 9) cooperating with the openings 25a in maintaining the filtration cycle of the machine, that is the cyclic sequence of operating zones through which the filtrate chamber units must pass due to the rotation of the filter table relative to the valve device. In the continuous operation of this cycle the filter cake is removed continuously from the filter area in a conventional manner, for instance by means of a motor driven screw conveyor V mounted in a horizontal frame 57a having its outer or delivery end supported upon a post 57b and its inner end upon the stationary turntable base 17.

Figure 9:
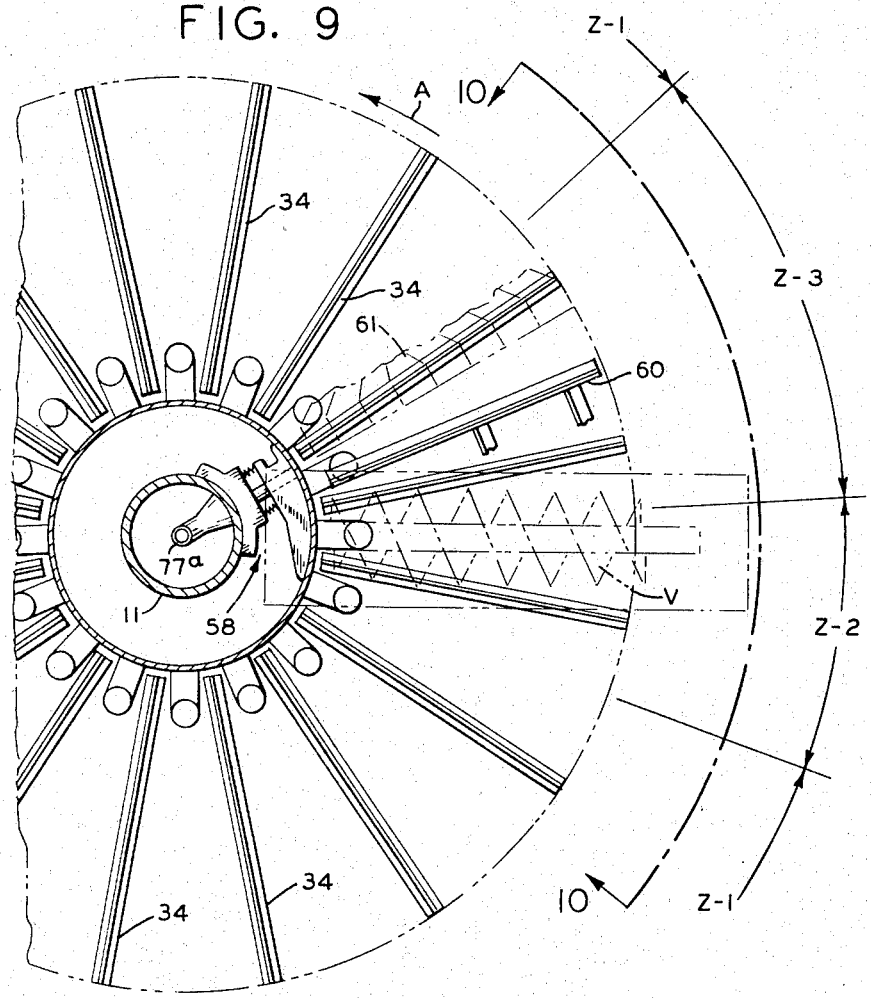
FIG. 9 is a part sectional plan view taken on line 9—9 in FIG. 1, illustrating the filtration cycle.
Figure 10:
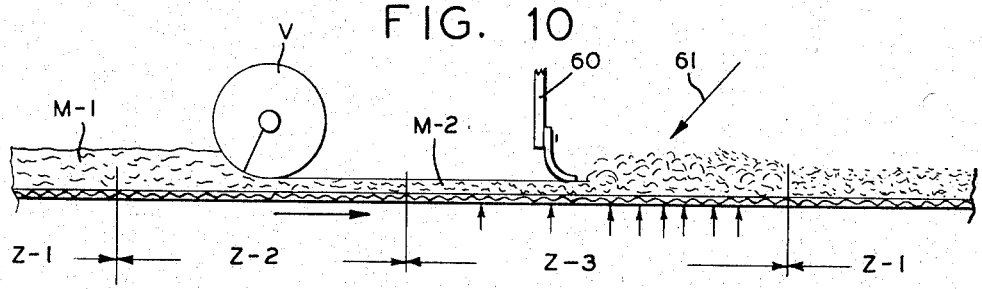
FIG. 10 is a side view taken on line 10—10 in FIG. 9, further diagrammatically illustrating the working of the filtration cycle.

As illustrated in FIG. 9 and with the filter table rotating in the direction of arrow A, the filtration cycle comprises a large vacuum zone Z–1 wherein a correspondingly large number of the filtrate chamber units communicate freely with the annular vacuum chamber 30. A neutral zone Z–2 follows at the end of the vacuum zone, whereby a correspondingly small number of filtrate chamber units are blanked off against the vacuum effect. Then follows an air blow-back zone Z–3 effective prior to the start of the vacuum zone. The neutral zone is required to allow the scroll conveyor device to discharge filter cake M–1 that has been dewatered in the preceding vacuum zone. The subsequent blow-back zone loosens a residual thin layer of cake material not removed by the scroll for the re-mixing of that residual material with the fresh feed pulp or suspension applied.

More in particular, the cake removal by the conveyer scroll occurs along a radial outward path that is in a direction substantially coinciding with the center line of the scroll. Thus the cake material is eventually caused to mount over the outer boundary wall of the filter table at the outer end of the scroll for discharge into a hopper 59 or the like. With the rotation of the filter table in the direction of arrow A the resulting residual layer M–2 of cake material enters the blow-back zone which becomes effective shortly after passing the line of cake discharge. However, since the blow-back builds up only gradually, it will not become practically effective until the residual layer has moved past a radially extending depending feed dam or squeegee 60 supported from the frame of the scroll conveyer device, and located at an intermediate point of the blow-back zone. The feed dam contains the feed pulp delivered by a feed chute device 61 into a feeding zone along the dam, so that the feed suspension will be prevented from spreading rearwardly in a direction opposite to the direction of rotation of the filter table. The residual layer of cake material passing under the dam will then be subjected to more intense back-blow effect loosening the material with sufficient intensity for intermixing the feed material spreading out along the dam.

Figure 6:
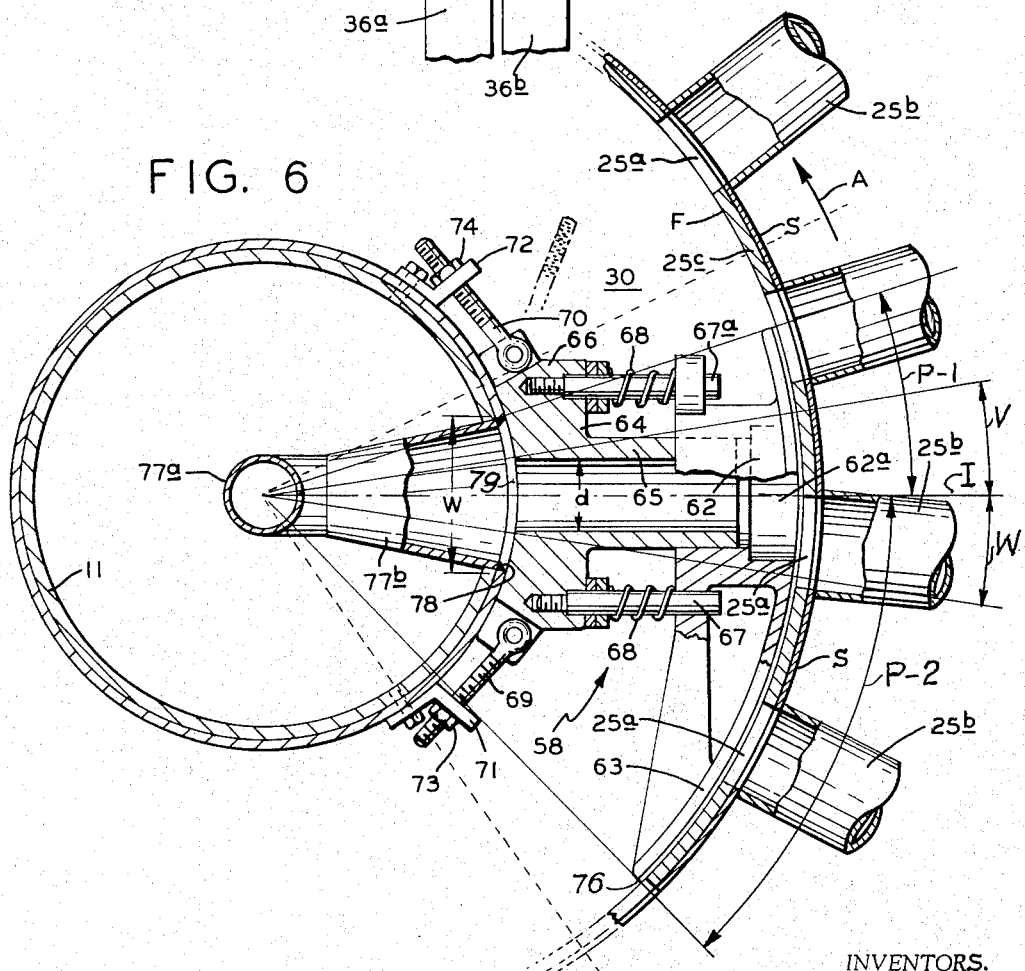
FIG. 6 is an enlarged cross-sectional detail view taken on line 6—6 of FIG. 1, more clearly showing the arrangement of the back-blow valve.

Referring to FIGURES 1 and 6, the valve device 58 itself comprises a slide shoe 62 having a curved outer working surface conforming to the surrounding rotating machined cylindrical working surface F provided interiorly of shell S. The slide shoe has an opening 62a communicating sequentially with the filtrate chamber units so as to apply air back-blow through one opening 25a at a time when passing through the back-blow zone Z–3. The neutral zone Z–2 substantially precedes the cake discharge zone, and is made effective by a corresponding arcuate extension 63 of the shoe, blanking off corresponding openings 25a, thus interrupting the vacuum effect from the annular vacuum chamber 30 to the respective filter chamber units.

The back-blow opening 62a of the slide shoe has a sliding fit allowing for radial movement upon a valve body 64. That is to say, the valve body has a neck portion 65 extending radially from a base- or saddle portion 66, with the shoe axially slideable thereon. A pair of guide rods 67 and 67a parallel to each other and to the neck portion extend rigidly from the saddle portion, one rod being located at each side of the neck portion and spaced therefrom in a horizontal plane. These guide rods have sliding engagement with the shoe and are each surrounded by a compression spring 68 tending to urge the shoe into operating sliding contact with the machined built-up cylindrical working surface F presented by the shell S rotating with the filter table.

The saddle portion of the valve body conforming to the external curvature of the center column is held securely in place thereon by quick-releasable swingable bolts 69 and 70 held by respective brackets 71 and 72 fixed upon the center column. In this way, the valve assembly including the valve body and slide shoe is quickly detachable from the center column by loosening nuts 73 and 74 and allowing the bolts to be swung free as indicated in dot-and-dash. The interior of the vacuum chamber and thus the valve construction are accessible through a manhole 75 provided in the bottom of the annular shell S. The slide shoe 62 may be provided with a replaceable working surface such as brake lining 76.

Back-blow air is supplied to the valve device 58 through a pipe 77 extending through the center opening of the drive head, and through the top plate 16 of the center column in sealed relationship therewith. This air supply pipe thus has a vertical leg 77a and a horizontal leg 77b terminating at the inner face of the center column and welded thereto at 78, along the periphery of an opening 79 provided in the wall of the center column. While this opening 78 has a vertical dimension substantially equal to the inner diameter $d$ of neck portion 65, it is horizontally widened to the dimension W, with the pipe leg 77b having a correspondingly widened terminal portion. Thus, the opening 79 permits the valve device to be shifted in a horizontal plane in either direction to the extent permitted by the greater dimension W relative to the smaller dimension $d$, thus permitting the filtration cycle to be shifted or timed angularly forwardly or rearwardly relative to the position of the feed-containing dam 60 and the conveyer screw device.

The extent of such angular shift of the valve body forwardly or rearwardly from center line I of leg 77b is indicated by angles V and W. The arcuate extent of the slide shoe is indicated by portions P–1 and P–2 measured in respective opposite directions from the center line of valve neck 64.

In summary, the invention features a center support column providing a turntable base for rotatably supporting a ring member to which the filter table structure is rigidly connected. This may provide a stationary center island, as well as a vertically extending stabilizing- or anti-tilting base of substantial length for the filter table.

In a preferred embodiment, a pre-assembled drive head may be readily mounted upon the center column and operatively connected to the filter table structure, the stationary center island being available to support the cake discharge conveyer means and/or other structure.

Furthermore, in a preferred embodiment, the area of the center island is utilized to accommodate the built-in vacuum receiver which in turn may serve as a mounting base for individual filtrate chamber units of the filter table, with the center column serving as a delivery duct for the receiver, as well as for the mounting of the valve controlling the filtration cycle.

The filter unit constructed according to the invention can be readily fabricated, readily shipped, and readily assembled by being bolted together, featuring the individual sector-shaped filtrate chamber units.

It will be furthermore understood that each of the elements, or two or more together, of the apparatus herein described, may also find useful application in other filters differing from the type described above.

Furthermore, while the invention has been illustrated and described as embodied in a rotary table filter comprising individually mounted sector-shaped filter units and having a built-in centrally disposed annular vacuum receiver chamber, it is not intended to be limited to the details shown, since various modifications and structural changes may be made without departing from the spirit of the present invention.

We claim:

1. A rotary table filter which comprises a hollow cylindrical stationary center support column having a closed top providing a stationary center island, upper inflow passage means, and lower outflow passage means for connection to a source of vacuum, a rotatable shell providing a vacuum receiver chamber concentrically surrounding said column and communicating through said upper flow passage means with the interior of said column, said shell having a vertical wall, an annular top portion, and an annular bottom portion, upper sealing means effective between said annular top portion and said column, lower sealing means effective between said annular bottom portion and said column, and located above said lower flow passage means of the center column, means for guiding and stabilizing the lower end of said rotatable shell relative to said stationary column, a ring member connected concentrically to the upper end portion of said shell, bearing means for rotatably supporting said ring member upon the top end portion of said column, an annular filter table structure having an outer cylindrical end wall and an inner cylindrical end wall concentrically surrounding said ring member in rigid relationship therewith, said concentric cylindrical end walls defining between them an annular filter surface, said table structure being subdivided into filter sectors each having a filtrate collecting chamber, an external communicating duct between each said filtrate collecting chamber and said vacuum receiver chamber, said external ducts providing vacuum flow connection along a path from said filtrate chambers through said external ducts, and said receiver chamber, and through the interior of said column by way of said upper and said lower flow passage means thereof, a separate filtrate discharge conduit located within said column, and arranged for the delivery of filtrate liquid from the lower portion of said vacuum receiver chamber, downwardly past said lower annular seal to a locality outside said center column, a blank-off slide shoe located within said receiver chamber and cooperating with said external communicating ducts for determining a cake discharge zone relative to a vacuum filtration zone incident to rotation of said filter table structure and said shell, support means for mounting said slide shoe upon said column, constructed and arranged for maintaining said slide shoe in cooperative relationship with said external communicating ducts, and drive means for rotating said filter table structure and said shell.

2. The table filter according to claim 1, wherein said lower outflow passage means comprise a neck extending laterally from the vertical wall of said column.

3. The table filter according to claim 1, wherein said guiding and stabilizing means comprise a circular track provided upon the lower end of said shell, and a set of guide rollers mounted on said column.

4. The table filter according to claim 1, with the addition of cake discharge devices, and means for supporting the inner end of said devices upon said stationary center island.

5. The table filter according to claim 1, wherein said bearing means comprise a turntable base mounted atop said column, wherein said ring member comprises an internally toothed gear, and wherein a pinion drive unit is mounted upon said turntable base, engaging said internal gear.

6. The table filter according to claim 5, wherein said turntable base comprises a vertical cylindrical foot portion mounted on said column, an annular platform portion extending horizontally from the upper end of said cylindrical portion substantially concentric therewith and constituting a horizontal platform portion, an annular trough concentric with said column, and having an inner peripheral wall depending rigidly from the outer edge portion of said horizontal platform portion, and wherein antifriction bearing means in said trough are provided for rotatably supporting said ring member, shell, and filter table structure, with the assembly of said ring member with gear, said turntable base, and antifriction bearing means, and said pinion drive unit together constituting a self-contained drive head mounted on said column.

7. The table filter according to claim 6, with the addition of a radially extending cake discharge scroll, with bearing means for supporting the inner end of said scroll mounted upon said platform portion of the turntable base.

8. The table filter according to claim 1, wherein said filter table structure comprises a set of spider arms extending radially outwardly from said shell, equally spaced from one another about the axis of rotation of the table structure, a set of individual sector-shaped filter chamber units, removably mounted upon said arms so that each two mutually adjoining units have their mutually adjoining sides supported upon a respective spider arm, the inner end walls of all said filter chamber units together constituting an inner boundary wall, and the outer end walls of all said chamber units together constituting an outer boundary wall, said inner and outer boundary walls defining between them the total annular filter area of the filter table structure.

9. The filter table according to claim 8, wherein said spider arms are removably bolted to said shell, and so as to be adjustable.

10. The filter table according to claim 8, wherein an annular shelf is fixed to the upper end portion of said shell concentric therewith, and wherein the inner ends of said spider arms have bolt connections with said shelf.

11. The table filter according to claim 8, wherein an annular shelf is fixed to the upper end portion of said shell concentric therewith, and wherein the narrow end of said filter chamber units is removably bolted to said shelf.

12. The table filter according to claim 8, wherein there are provided inner vertical sealing means for said inner end walls at the mutually adjoining ends thereof, outer vertical sealing means for said outer end walls at the mutually adjoining ends thereof, and horizontal sealing means along mutually adjoining sides of said filter chamber units.

13. The table filter according to claim 1, wherein said slide shoe is angularly adjustable upon said column in a horizontal plane in a manner to retard or to advance the zone of cake discharge.

14. The table filter according to claim 1, wherein said support means for the slide shoe comprise a base member mounted on said column angularly adjustable thereon, and carrying said slide shoe in telescoping relationship therewith while secured against rotation relative to said shell.

15. The table filter according to claim 1, wherein said support means for the slide shoe comprise a valve body mounted on said column angularly adjustable thereon, and carrying said slide shoe in telescoping relationship therewith while secured against rotation relative to said valve body, the assembly of said column, said valve body and said slide shoe being constructed so as to constitute a radial passage providing communication between the interior of said column and respective external communicating ducts, with the addition of an air blow-back conduit extending into said column, and having its inner end jointed to the wall of said column in a manner to supply blow-back air pressure through said radial conduit to said external communicating ducts.

References Cited

UNITED STATES PATENTS

| | | |
|---|---|---|
| 882,202 | 3/1908 | Hunt. |
| 985,611 | 2/1911 | Lynch. |
| 2,188,840 | 1/1940 | McCue _____ 210—395 X |
| 3,080,063 | 3/1963 | Krynski et al. |

FOREIGN PATENTS

| | | |
|---|---|---|
| 437,740 | 2/1912 | France. |
| 251,932 | 10/1912 | Germany. |
| 287,513 | 9/1915 | Germany. |

REUBEN FRIEDMAN, *Primary Examiner.*

F. A. SPEAR, *Assistant Examiner.*